June 22, 1954   G. W. SHERON   2,681,686
UNIVERSAL SEAT
Filed March 6, 1950
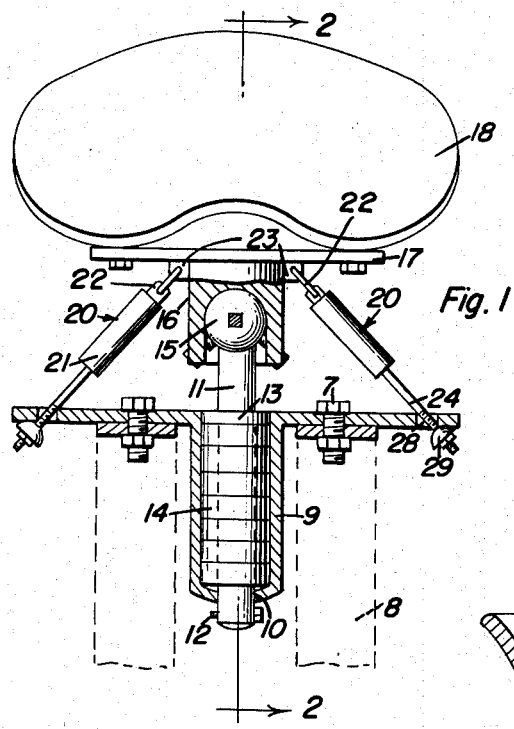
Fig. 1
Fig. 3
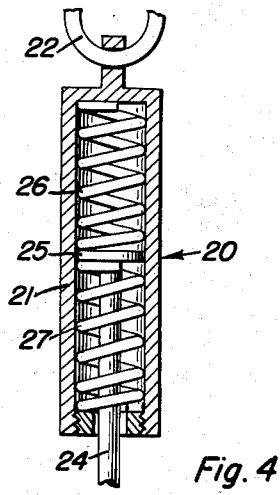
Fig. 4
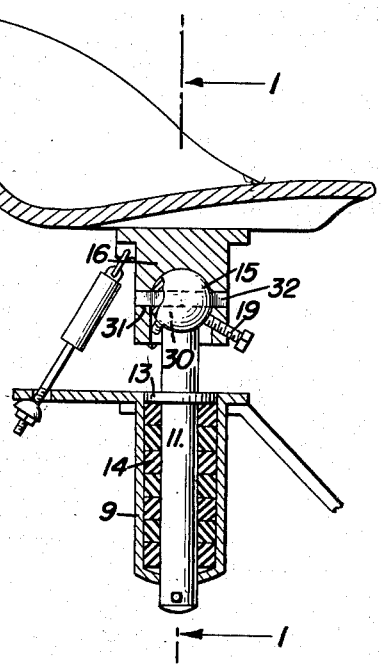
Fig. 2
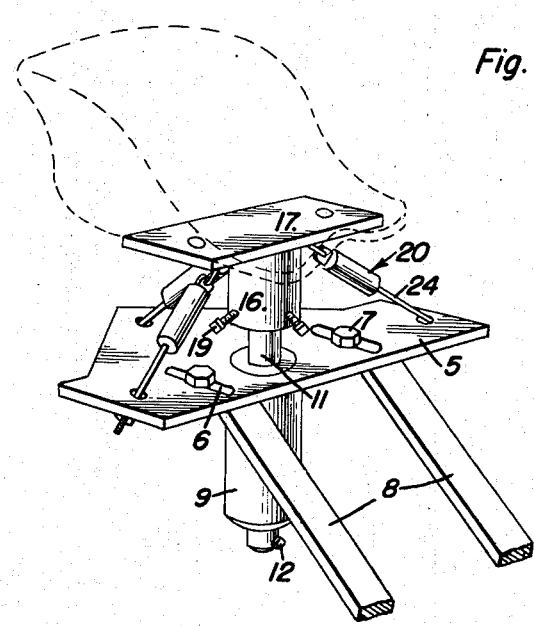
George W. Sheron
INVENTOR.
BY
*Attorneys*

Patented June 22, 1954

2,681,686

UNITED STATES PATENT OFFICE 2,681,686

UNIVERSAL SEAT

George W. Sheron, Topeka, Kans.

Application March 6, 1950, Serial No. 147,789

1 Claim. (Cl. 155—9)

The present invention relates to new and useful improvements in seat structures for use upon farm implements, such as tractors, plows and the like and more particularly to a universally movable seat that will at all times maintain a level or substantially horizontal position while the farm implement is travelling over uneven ground or where one wheel of the tractor is travelling at a different level from the other.

An important object of the invention is to provide a universal seat constructed to provide shock absorbing means as well as self leveling means.

A further object of the invention is to provide a seat embodying the features of invention above referred to and constructed for mounting as a unit on the supporting posts of a tractor or other farm implement without necessitating any changes or alterations in the construction thereof.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a view partly in vertical section and partly in front elevation taken on the line 1—1 of Figure 2;

Figure 2 is a vertical sectional view taken on a line 2—2 of Figure 1;

Figure 3 is a perspective view with the seat shown in dotted lines for clearer illustration of the attaching plate for the seat; and Figure 4 is a vertical sectional view of one of the leveling springs for the seat taken on a line 4—4 of Figure 1.

Referring now to the drawing in detail wherein for the purpose of illustration I have disclosed a preferred embodiment of the invention, the numeral 5 designates an attaching plate having a pair of spaced parallel slots 6 for adjustably receiving the bolts and nuts 7 for attaching the plate to a pair of seat supporting posts 8 forming part of a usual tractor or farm implement structure.

The attaching plate 5 is formed at its central portion with a cylinder 9 which extends downwardly from the plate, the cylinder being open at its top and closed at its bottom and formed in its bottom with a central opening 10.

A vertical seat supporting pin 11 is positioned in cylinder 9 with its lower end slidable in opening 10 and provided with a transverse bolt or screw 12 in its lower end forming a stop to limit upward movement of the pin in the cylinder. The pin 11 is formed with a flange 13 which is integrally cast or otherwise suitably secured to the pin adjacent its upper portion and having a working fit in the upper portion of cylinder 9 to maintain the pin in a perpendicular position therein. Resilient rubber or other suitable washers 14 are placed in the cylinder under the flange 13.

The upper end of pin 11 is formed with a ball 15 positioned upwardly in a socket 16 formed at its top with an attaching plate 17 for attaching to the underside of a seat 18. The ball is held in position in the socket by set screws 19.

A plurality of seat stabilizers are designated generally at 20 and comprise cylinders 21 each having an attaching ring 22 at their upper ends for attaching to apertured lugs 23 at the underside of upper plate 17. The upper end of a rod 24 is slidable in the lower end of cylinder 21 and is provided with a flange or plunger 25 working in the cylinder and with an upper coil spring 26 positioned in the cylinder above the plunger and a coil spring 27 positioned in the lower portion of the cylinder below the plunger. The lower end of rod 24 extends freely through an opening 28 adjacent the edge of lower plate 5 and held therein by a nut 29 threaded on the lower end of the rod.

The stabilizers 20 are positioned at the back and sides of seat 18 to yieldably hold the seat in a horizontal position while the seat is free to swing or swivel on ball 15 in a universal movement so that a person occupying the seat may sit upright in a comfortable position when the farm implement is tilted from side to side or is travelling up hill or down hill. The bottom of the socket 16 by engagement with the pin 11 will prevent the seat 18 from collapsing rearwardly by limiting tilting of said seat.

The resilient washers 14 in cylinder 9 and under flange or plunger 13 provide shock absorbing means for the seat.

If desired the seat 18 may be locked in a fixed position on ball 15 by inserting a pin 32 through aligned openings 30 and 31 in the ball 15 and socket 16.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A tractor seat structure comprising a plate attachable to the tractor, a vertical cylinder depending from said plate below the same, a vertical stem slidably mounted in said cylinder and extending above the plate, shock absorbing means for said stem within the cylinder, a seat, a seat supporting device swivelled on said stem above said plate for universal tilting of the seat vertically, stabilizers for said seat at the sides and back thereof inclining upwardly in converging relation from said plate to said device and comprising cylinders having upper ends connected to said device, rods slidably extending out of the lower ends of the cylinders and freely slidable in apertures in said plate with nuts thereon below the plate, and coil springs in said cylinders opposing sliding of said rods in the lower ends of the cylinders.

References Cited in the file of this patent

UNITED STATES PATENTS

| Number | Name | Date |
|---|---|---|
| 1,215,736 | Stafford | Feb. 13, 1917 |
| 1,731,412 | Froesch | Oct. 15, 1929 |
| 2,132,291 | Fitos | Oct. 4, 1938 |
| 2,284,352 | Zank | May 26, 1942 |
| 2,489,981 | Rose | Nov. 29, 1949 |
| 2,526,552 | Gillespie | Oct. 17, 1950 |

FOREIGN PATENTS

| Number | Country | Date |
|---|---|---|
| 29,914 | Great Britain | 1910 |